United States Patent
Lalli et al.

(10) Patent No.: US 6,726,527 B2
(45) Date of Patent: Apr. 27, 2004

(54) AUTOMATIC DISC REPAIR SYSTEM

(76) Inventors: Edward A. Lalli, 7546 N. 50th Ave., Glendale, AZ (US) 85301; William M. Doherty, 6713 N. 26th Ave., Phoenix, AZ (US) 85017; John L. Doherty, Jr., 8705 N. 58th La., Glendale, AZ (US) 85302

( * ) Notice: Subject to any disclaimer, the term of this patent is extended or adjusted under 35 U.S.C. 154(b) by 55 days.

(21) Appl. No.: 10/164,071

(22) Filed: Jun. 6, 2002

(65) Prior Publication Data

US 2002/0187733 A1 Dec. 12, 2002

Related U.S. Application Data

(60) Provisional application No. 60/296,991, filed on Jun. 8, 2001.

(51) Int. Cl.$^7$ ............................................. B24B 49/00
(52) U.S. Cl. ............................ 451/5; 451/41; 451/288; 451/287
(58) Field of Search ............................ 451/5, 41, 288, 451/287, 285, 28

(56) References Cited

U.S. PATENT DOCUMENTS

| 6,126,517 | A  | * | 10/2000 | Tolles et al. ................... 451/41 |
| 6,402,588 | B1 | * | 6/2002  | Matsuo et al. .................. 451/5   |
| 6,413,154 | B1 | * | 7/2002  | Togawa et al. ............. 451/285      |
| 6,435,941 | B1 | * | 8/2002  | White ............................ 451/5 |
| 6,572,444 | B1 | * | 6/2003  | Ball et al. ..................... 451/10 |
| 6,575,816 | B2 | * | 6/2003  | Hempel et al. ............... 451/41     |
| 6,595,835 | B2 |   | 7/2003  | Gadbois ...................... 451/66    |

* cited by examiner

Primary Examiner—Lee D. Wilson
(74) Attorney, Agent, or Firm—Martin L. Stoneman (57) ABSTRACT

An automatic system for repairing scratches on optically-read discs, (e.g., compact discs often called "CD's" or DVD's). More specifically, an automatic system for refurbishing a plurality of disc surfaces at substantially the same time, such that when refurbished, an optical reader, which uses a laser to read digital information stored on such a disc, can read the digital information on the disc without the optical distortion caused by a scratch.

20 Claims, 5 Drawing Sheets

AUTOMATIC DISC REPAIR SYSTEM

CROSS-REFERENCE TO RELATED APPLICATION

The present application is related to applicant's prior U.S. Provisional Application No. 60/296,991, filed Jun. 8, 2001, entitled "AUTOMATIC DISC REPAIR SYSTEM", the contents of which are herein incorporated by reference and are not admitted to be prior art with respect to the present invention by their mention in this cross-reference section.

BACKGROUND

This invention relates to an automatic system for repairing scratches on optically-read discs, e.g., compact discs (often called "CD's" or DVD's). More specifically, this invention provides an automatic system for refurbishing a plurality of disc surfaces at substantially the same time, such that when refurbished, an optical reader, which uses a laser to read digital information stored on such a disc, can read the digital information on the disc without the optical distortion caused by a scratch.

Typically, digitally recorded discs, known commonly as "CD" discs or "DVD" discs, contain audio or video information. The digital information is currently interpolated or read by an optical reader that uses one or more laser beams or other light amplified beams to read the digital information. The current state of the art of manufacture of these CD discs is such that they are comprised of a round disc composed of a synthetic material (e.g., plastic), with a typical diameter of approximately 4¾ inches and an approximate thickness of 1/16 inches. The disc size varies slightly as to CD's or DVD's. The disc typically has a center aperture approximately ⅝ inches in diameter for receiving a centering spindle in a playback apparatus. Digitally recorded material typically extends on one or both sides of the disc, from a data band extending about ¾ inches from the center aperture outward to within about ¼ inch of the peripheral end of the disc. A bearing area may extend on one or both sides, in approximately the same dimensions, for bearing on a playback apparatus which spins the disc at high speed. The digital information is contained on a relatively thin layer of metallic material covered by a protective layer of the synthetic material, usually a plastic. A laser within the playback apparatus reads the digital information through the plastic layer. Recently (for example), optically-read discs include multi-layer laminated discs; and it is pointed out that describing discs generally herein is not intended to limit the technology of optically-read discs which is addressed herein. If the plastic layer becomes scratched or stained, the laser light will distort and not accurately read the digital information.

Such scratched discs are commercially repaired in quantity. The refurbishing of these discs in quantity is labor intensive and a more inexpensive means for such commercial repair services is desirable. Thus, there exists a need for a more efficient solution to the problems of quantity repair of scratched discs.

OBJECTS OF THE INVENTION

A primary object and feature of the present invention is to fulfill the above-mentioned need by the provision of an automatic disc repair system embodied by an automatic system and apparatus which is provided for the purpose of repairing multiple discs at a time, such that the digital information on such discs may be read by an optical reader playback apparatus. In addition, it is a primary object of this invention to provide such other advantages as will become apparent with reference to the following invention descriptions.

SUMMARY OF THE INVENTION

According to a preferred embodiment of the present invention, this invention provides a system for reconditioning at least one scratched operating surface of at least one optically-read disc, comprising, in combination: at least one rotatable supporting means, comprising a support surface positioned in substantially a first plane, for supporting the at least one optically-read disc; power means for powered rotation about a first axis; and abrader means, rotatably powered by such power means, for abrading the scratched operating surface by rotation in a second plane substantially parallel to such first plane.

According to another preferred embodiment of the present invention, this invention provides a system for reconditioning at least one scratched operating surface of each of a plurality of optically-read discs, comprising, in combination: a plurality of rotatable supporting means, comprising a plurality of support surfaces, each respective such support surface being positioned in substantially a first plane, for supporting each respective optically-read discs; power means for powered rotation about a first axis; and abrader means, rotatably powered by such power means, for abrading each respective scratched operating surface of each respective optically-read disc by rotation in a second plane substantially parallel to such first plane.

It also provides such a system further comprising disc transport means for placing a plurality of respective optically-read discs on respective such support surfaces. And, it provides such a system further comprising disc transport means for removing a plurality of respective optically-read discs from respective such support surfaces.

According to yet another preferred embodiment of the present invention, this invention provides a system for reconditioning at least one scratched operating surface of each of a plurality of optically-read discs, comprising, in combination: a plurality of system stations, each such system station comprising; a plurality of rotatable supporting means, comprising a plurality of support surfaces, each respective such support surface being positioned in substantially a first plane, for supporting each respective optically-read discs; power means for powered rotation about a first axis; abrader means, rotatably powered by such power means, for abrading each respective scratched operating surface of each respective optically-read disc by rotation in a second plane substantially parallel to such first plane; and disc transport means for moving each respective optically-read disc from a first such system station to a second such system station.

Further, it provides such a system further comprising; abrasive means for abrading at least one scratched operating surface of at least one optically-read disc; wherein such abrasive means comprises a plurality of abrasive compounds, each such abrasive compounds comprising a different range of grit sizes; and wherein each such system station is structured and arranged to utilize at least one such range of grit sizes of such abrasive compounds. It also provides such a system wherein a first such system station utilizes a larger such range of grit sizes of such abrasive compounds than an adjoining second such system station.

Even further, it provides such a system wherein such disc transport means is structured and arranged to transport such at least one disc from such first station to such second station.

According to still other preferred embodiments of the present invention, this invention provides the system according to each of the above statements, further comprising: abrasive means for abrading at least one scratched operating surface of at least one optically-read disc; and wherein such abrasive means comprises a series of diamond grit abrasives ranging from a larger diamond grit to a smaller diamond grit.

This invention further provides each and every novel detail, system, method or device mentioned in this provisional application, including drawing, claims, and abstract.

DETAILED DESCRIPTION OF A PREFERRED EMBODIMENT OF THE INVENTION

Figure 1:
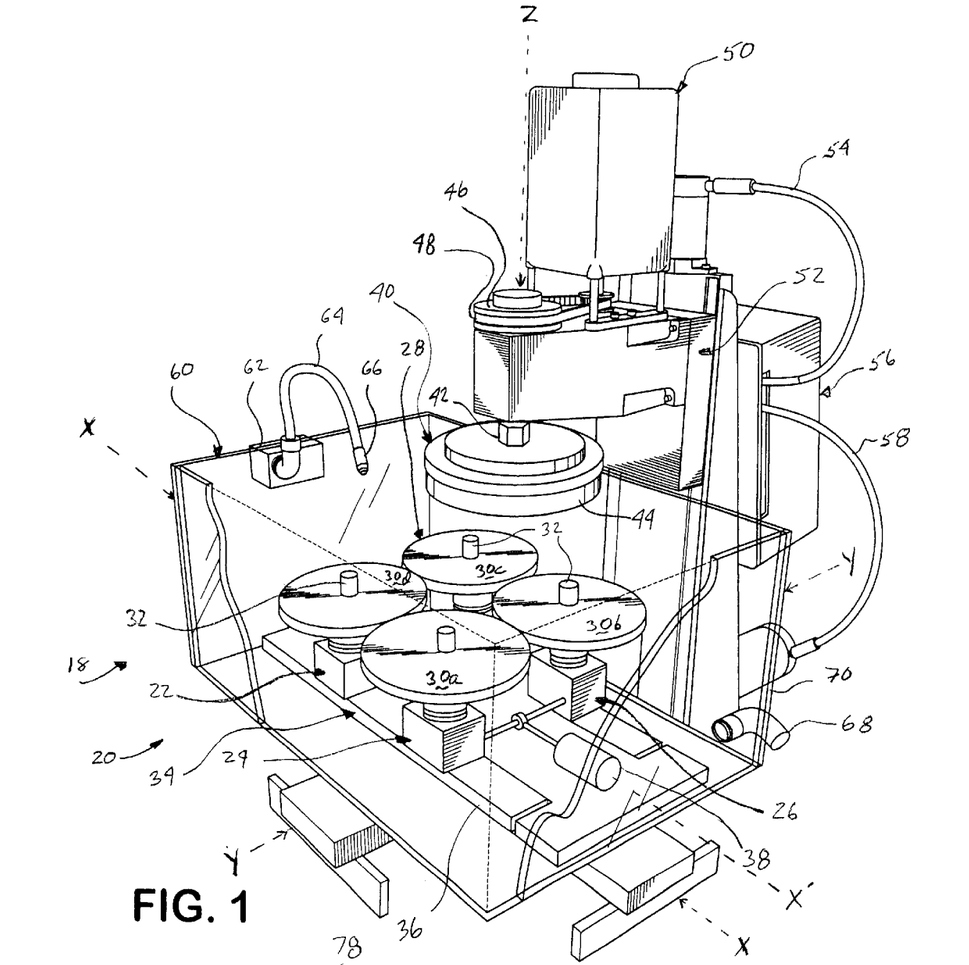
FIG. 1 is a perspective view of the automatic disc repair system according to a preferred embodiment of the present invention.

Illustrated in FIG. 1 is a perspective view of the automatic disc repair system 20 (illustrating a single station 18) according to a preferred embodiment of the present invention. In the illustrated embodiment, there are preferably four rotatable disc supports 22, 24, 26, and 28. Preferably, each rotatable disc support 22, 24, 26, and 28 comprises a respective support surface 30a, 30b, 30c, and 30d, and a central spindle 32. Preferably, each respective support surface 30a, 30b, 30c, and 30d is approximately 4¾ inches in diameter, however under appropriate circumstances, other sizes may suffice (preferably sized to match the disc being refurbished). Preferably, the spindle 32 is approximately ⅝ inches in diameter (to fit the central aperture on a disc).

Preferably, rotatable disc supports 22, 24, 26, and 28 are attached to an adjustable base 34. Preferably, adjustable base 34 may be adjusted along two axis, Axis X and Axis Y. In addition, rotatable disc supports 22 and 28 are preferably further adjustably attached on a sliding mechanism 36, attached to adjustable base 34 such that rotatable disc supports 22 and 28 may be further adjusted. Preferably, rotatable disc supports 22 and 28 may be further adjusted along Axis X', which is preferably parallel to Axis X. Preferably, sliding mechanism 36 is adjusted by an actuator 38 which is preferably digitally controlled. Preferably, the actuator has an adjustment of at least about 10 millimeters to adjust to the size difference between standard CD discs and DVD10 and DVD18 discs.

The automatic disc repair system 20 also comprises a power-driven rotatable polisher 40. Preferably, polisher 40 further comprises a center drive spindle 42 and a removably-attached polishing disc 44. Preferably, the polishing disc 44 comprises a medium density, closed-cell foam, 5½-inch-diameter, ¾-inch thick polishing disc (such as that available from Foamex, 4011 West Clarendon, Phoenix, Ariz. 85019). Preferably, the center drive spindle 42 is power driven through the use of a pulley 46, attached to the center drive spindle 42, and a belt 48 arrangement driven by a power drive motor 50, as shown. Preferably, the rotatable polisher 40, center drive spindle 42, removably attached polishing disc 44, pulley 46, belt 48 and power drive motor 50 are all attached to a vertically adjustable assembly 52, as shown. Preferably, vertically adjustable assembly 52 is adjustable along Axis Z, as shown. In all the preferred embodiment described herein, vertical pressure on the discs during abrading is preferably controlled by bringing the foam disc 44 to touching-the-CD position and then moving the spindle holding the disc 44 downward another 10 millimeters into abrading position. Preferably, the adjustments of Axis X, Axis Y, Axis X', and Axis Z are digitally controlled. Illustrated in FIG. 1 are cable 54 and cable 58 which extend from a control unit 56 (preferably US Digital Controller E2-200-200-E). Preferably, the control unit 56 has, or is connected to, a computer (see computer 110 shown in FIG. 8 and FIG. 9) further comprising appropriate software (known by those knowledgeable in the art, such as that utilizing G-code, a common computer numeric control programming language) for programming and directing the positioning of the adjustable base 34, sliding mechanism 36 and vertically adjustable assembly 52. In addition, the control unit 56 also preferably controls the power drive motor 50 speed, on/off mode and several other functions that will be described in further detail below. Under appropriate circumstances other arrangements may suffice.

Also illustrated in FIG. 1 is enclosure 60. Preferably, enclosure 60 is a clear plastic material (e.g., Plexiglas® or Lucite®) and provides an area which is substantially enclosed on all but the top, as shown. Preferably, enclosure 60 is about sixteen inches wide by about twelve inches deep by about seven and one-half inches high and comprises, preferably, about one-quarter-inch-thick material. Preferably, the enclosure 60 assists in maintaining the cleanliness of the workplace external to the enclosure 60 and assists in waste removal and recycling of the refurbishing materials (described with respect to FIG. 10 below). Preferably, attached to enclosure 60 is solenoid valve 62 which comprises an adjustable spray arm 64 (preferably, an about nine-inch flexible hose with about a three-thousand PSI rating) and spray tip 66. It is preferable to have a solenoid valve 62, adjustable spray arm 64 and spray tip 66 on both ends of the enclosure (see FIG. 10, and solenoid valve 62', adjustable spray arm 64' and spray tip 66'). Preferably, the solenoid valve 62 assists in controlling abrasive material which is preferably sprayed onto the disc supports, 22, 24, 26, and 28 (further explained in reference to FIG. 10). Under appropriate circumstances, only a water mist for cooling may be so sprayed and the abrasive material applied directly to each disc. In addition, there is a drain 68, preferably attached on the rear portion 70 of the enclosure 60 which is used to drain the abrasive material 90 and/or cooling fluid from the enclosure (further detailed in FIGS. 8–10). Preferably, enclosure 60 is sloped no less than 5 degrees such that the abrasive material 90 will move toward the drain 68. Preferably, drain 68 is about a ⅝-inch opening.

Figure 2:
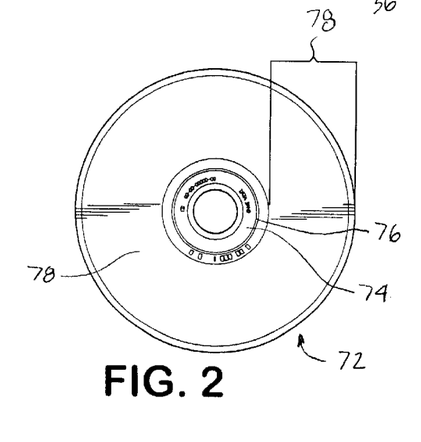
FIG. 2 is a top view of an optically-read disc illustrating a typical disc data band and data storage area.
Figure 3:
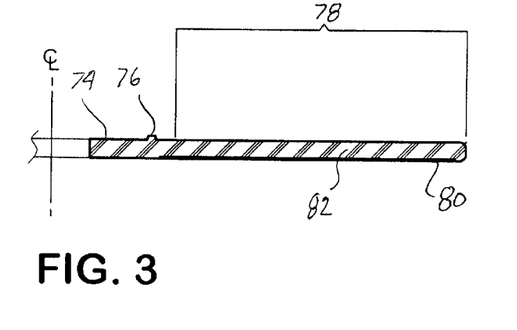
FIG. 3 is a side view partially in section of the disc of FIG. 2.

FIG. 2 is a top view of an optically-read disc 72 illustrating a typical disc data band 74, stacking ring 76, and data storage band 78. FIG. 3 is a side view partially in section of the disc of FIG. 2. Typical Compact Discs (herein referred to as CD's) utilize data on a single side. Recently, use of DVD discs (digital video discs) have utilized two sides for data storage. The process for refurbishing either side of such discs is substantially similar to that herein described. In the embodiment of a CD illustrated in FIG. 2 and FIG. 3, the digital information is contained on a relatively thin layer of metallic material 80 covered by a protective layer of synthetic material, preferably plastic layer 82 (although under appropriate circumstances other materials may suffice). Typically, with current technology, a laser within a playback apparatus reads the digital information through the plastic layer 82. If the plastic layer 82 becomes scratched or stained, the laser cannot accurately read the digital information. Preferably, the refurbishing of the optically-read disc 72 occurs only in the data storage band 78. Preferably, the abrading does not extend past the stacking ring 76. The disc data band 74 is primarily used for initialization of the disc 72, depending on the disc format.

Figure 4:
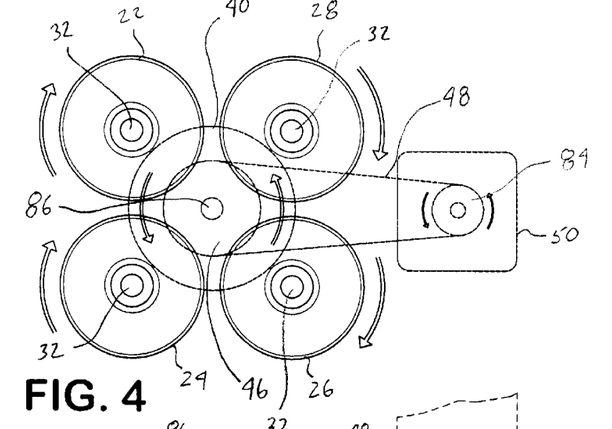
FIG. 4 is a diagrammatic top view illustrating the rotation of the rotatable disc supports, power driven rotatable polisher, pulley, belt and power drive motor of the automatic disc repair system according to a preferred embodiment of the present invention.

FIG. 4 is a diagrammatic top view illustrating the rotation of the rotatable disc supports, 22, 24, 26, and 28, power driven rotatable polisher 40, pulley 46, belt 48 and power drive motor 50 of the automatic disc repair system 20 according to a preferred embodiment of the present invention. Preferably, power drive motor 50 turns a pulley 84. In the illustrated embodiment, the pulley 84 rotates counter-clockwise; however, under appropriate circumstances other arrangements may be suitable. Preferably, the rotation from pulley 84 is transferred to pulley 46 by belt 48 which is connected to both pulley 46 and pulley 84.

Preferably, pulley 46 is connected by spindle 86 to rotatable polisher 40. In the above described manner, rotation is transferred from the power drive motor 50 to the rotatable polisher 40 (preferably a nominal rpm of about 1200, a preferable range of about 600 to 2000 rpm). Preferably, the power drive motor 50 is a 110 volt Dayton Motor serial #2M145. Preferably, pulley 84 is about a 1-inch gear and pulley 46 is about a 2¾ inch gear. Preferably, spindle 86 is between about a ¼-inch and about a ⅝-inch spindle diameter. Preferably, belt 48 is a ⅜-inch synchronous, segmented belt (made by BAN). As will be further described below in FIG. 6, during operation of the automatic disc repair system 20, the rotatable polisher 40 preferably contacts four discs 72, which are placed on support surfaces 30a, 30b, 30c, and 30d. Preferably, support surfaces 30a, 30b, 30c, and 30d comprise a surface having a non-slip surface, which is preferably a rubber material (e.g., a custom cut piece of open-cell rubber approximately ⅛-inch thick, Model No. O-C SBR SNG #3120, available from RubberiteÔ Corp., 301 East Goetz Ave, Santa Ana, Calif. 92707). Preferably, support surfaces 30a, 30b, 30c, and 30d are connected to respective rotatable disc supports 22, 24, 26, and 28 (as shown in FIG. 1). Preferably, rotatable disc supports 22, 24, 26, and 28 comprise bearings 88 (see FIG. 5) which allow the support surfaces 30a, 30b, 30c, and 30d to rotate (all in the same plane), preferably horizontally, as shown, and preferably in a parallel plane to that of abrading surface of the rotatable polisher 40. Preferably, bearings 88 comprise an integral shaft bearing as made by Hoover NSK such as serial #885586. Preferably, when rotatable polisher 40 with attached polishing disc 44 contacts the discs 72, the rotating motion of the rotatable polisher 40 with attached polishing disc 44 causes the support surfaces 30a, 30b, 30c, and 30d to rotate in the opposite direction, as shown. Preferably, bearings 88 create a slight resistance to the rotatable disc supports 22, 24, 26, and 28 such that there is a slight slowdown in the otherwise rotating speed the abrader 44 would friction-drive the support surfaces. For the herein described preferred embodiments, with the described support bearings and the described vertical "pressure" movement (of about 10 millimeters), at a spindle drive rotation of 1200 rpm (with a 5½-inch foam abrader 44), the driven rotation speed of the rotatable disc supports 22, 24, 26, and 28 is about the same rpm (i.e., about 1200 rpm) for standard-size CD supports.

Figure 5:
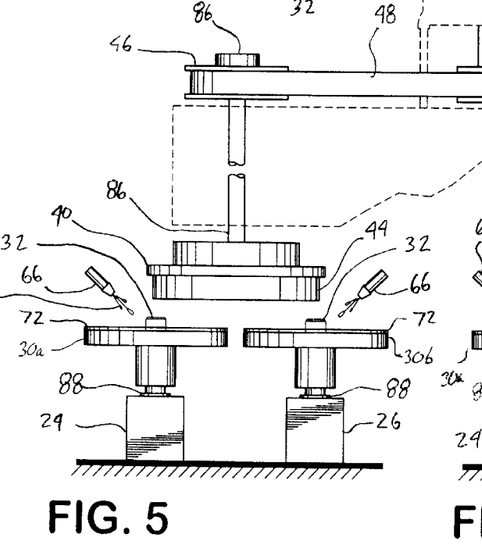
FIG. 5 is a partial perspective view, partially in section illustrating the power driven rotatable polisher in a raised position along with application of an abrasive of the automatic disc repair system according to a preferred embodiment of the present invention.
Figure 6:
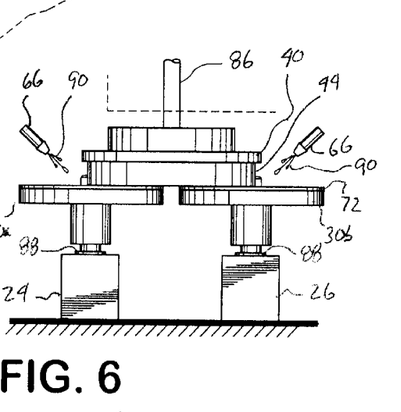
FIG. 6 is a partial perspective view, partially in section illustrating the power driven rotatable polisher in a lowered position along with application of an abrasive of the automatic disc repair system according to a preferred embodiment of the present invention.

FIG. 5 is a partial perspective view, partially in section, illustrating the power driven rotatable polisher 40 in a raised position (along Axis Z) and the application of an abrasive 90 of the automatic disc repair system 20 according to a preferred embodiment of the present invention. FIG. 6 is a partial perspective view, partially in section, illustrating the power driven rotatable polisher 40 in an operating position 94 (see FIG. 8) along with application of an abrasive 90 of the automatic disc repair system 20 according to a preferred embodiment of the present invention.

During operation, a disc 72 is preferably placed onto each of the respective support surfaces 30a, 30b, 30c, and 30d. Preferably, an abrasive 90 is then applied onto the disc 72. Preferably, the abrasive 90 is sprayed-on, as shown. Preferably, a series of abrasives 90 is serially applied to each disc with each successive abrasive varying downward in grit size such that each successive grit size assists in the removal of ever lesser amounts of material from the disc 72. Preferably, a diamond abrasive is used. Preferably, diamond abrasive (e.g., those available from Engis Corp., 105 W. Hintz Rd., Wheeling, Ill. 60090) is utilized as the abrasive 90 material at the preferred following grits: 60 microns, 30 microns, 15 microns and 6 microns. Under appropriate circumstances, other arrangements may be suitable. As will be further explained with respect to FIG. 7 through FIG. 9, the support surfaces 30a, 30b, 30c, and 30d and accompanying discs 72 are located along Axis X, Axis Y and Axis X' by positioning of the adjustable base 34, sliding mechanism 36 and assembly 52. The support surfaces 30a, 30b, 30c, and 30d and accompanying discs 72 are preferably located such that Axis Z is centered in the removably attached polishing disc 44 and is located equi-distant from the center of each respective spindle 32. In this manner the polishing disc 44, when in the operating position 94, (as shown in FIG. 6) will equally abrade each respective disc 72 as the polishing disc 44 rotates (preferably as shown in FIG. 4). Preferably, the disc 72 is only abraded in the data storage band 78 area of each disc 72 (described in FIG. 2).

Preferably, the abrasive 90 is applied just prior and used during the polishing process for a period of about one minute for each grit. Preferably, between applications of different grit, a cleansing fluid is sprayed onto the disc. Preferably, the cleansing fluid is water and is distributed through the solenoid valve 62, adjustable spray arm 64 and spray tip 66 or a separate such system. Under appropriate circumstances other arrangements may be suitable.

Figure 7:
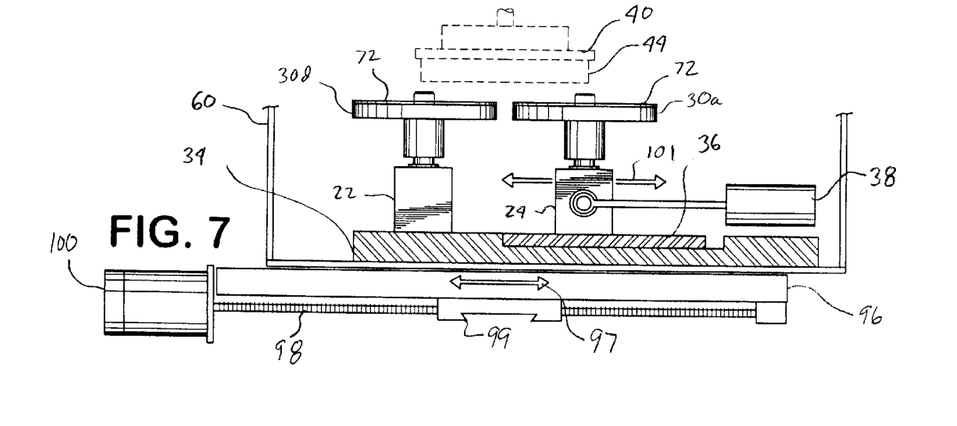
FIG. 7 is a partial perspective view, partially in section illustrating the adjustability of the rotatable disc supports individually and the adjustable base along a first and second respective axis, of the automatic disc repair system according to a preferred embodiment of the present invention.

FIG. 7 is a partial perspective view, partially in section, illustrating the adjustability of the rotatable disc supports (illustrating rotatable disc supports 22 and 24) individually and the adjustable base 34 along a first and second respective axis, of the automatic disc repair system 20 according to a preferred embodiment of the present invention. Preferably, adjustable base 34 is supported by platform 96, which is slidably adjustable using a screw 98 and actuator 100 assembly, as shown, to adjust the platform 96 along a first axis 97, which is preferably in the direction of Axis X (See FIG. 1) and preferably horizontal. Preferably, adjustable base 34 is supported by platform 96 using a slidable reverse bevel key-way and groove assembly 99, as shown. Preferably, the actuator 100 is digitally controlled, however, under appropriate circumstances other arrangements may suffice. Preferably, rotatable disc supports 24 and 26 (See FIG. 1) are slidably attached to sliding mechanism 36. Preferably, sliding mechanism 36 is slidably adjustable using an actuator 38 which preferably either pulls or pushes the sliding mechanism 36 along a second axis 101, which is preferably in the direction of Axis X' (See FIG. 1) and preferably horizontal.

Figure 8:
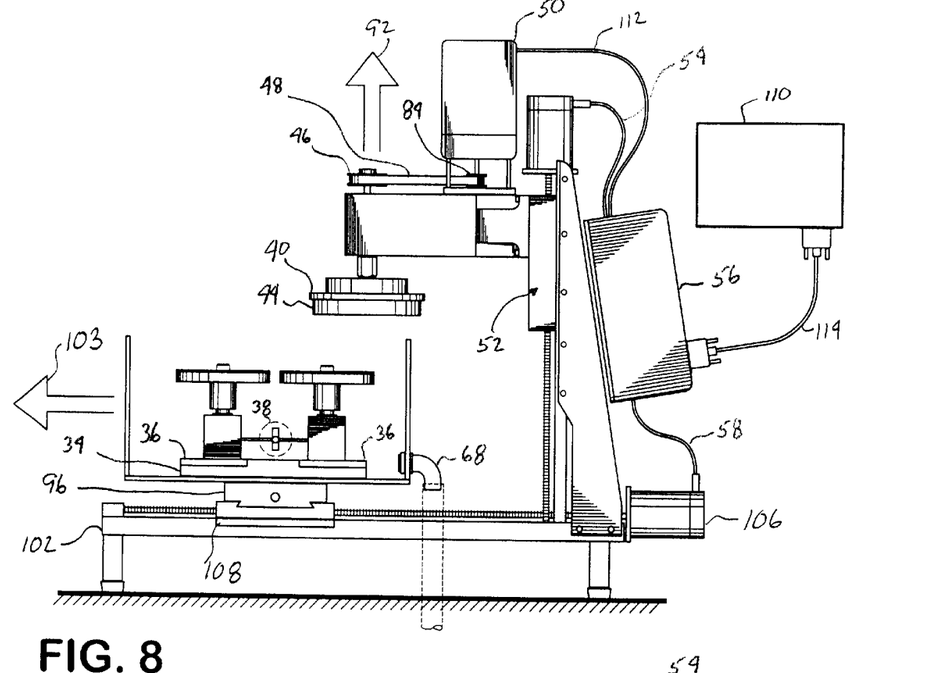
FIG. 8 is a perspective view, partially in section of the automatic disc repair system illustrating the adjustability of the adjustable base along a third axis and the adjustability of the vertically adjustable assembly along a fourth axis according to a preferred embodiment of the present invention.
Figure 9:
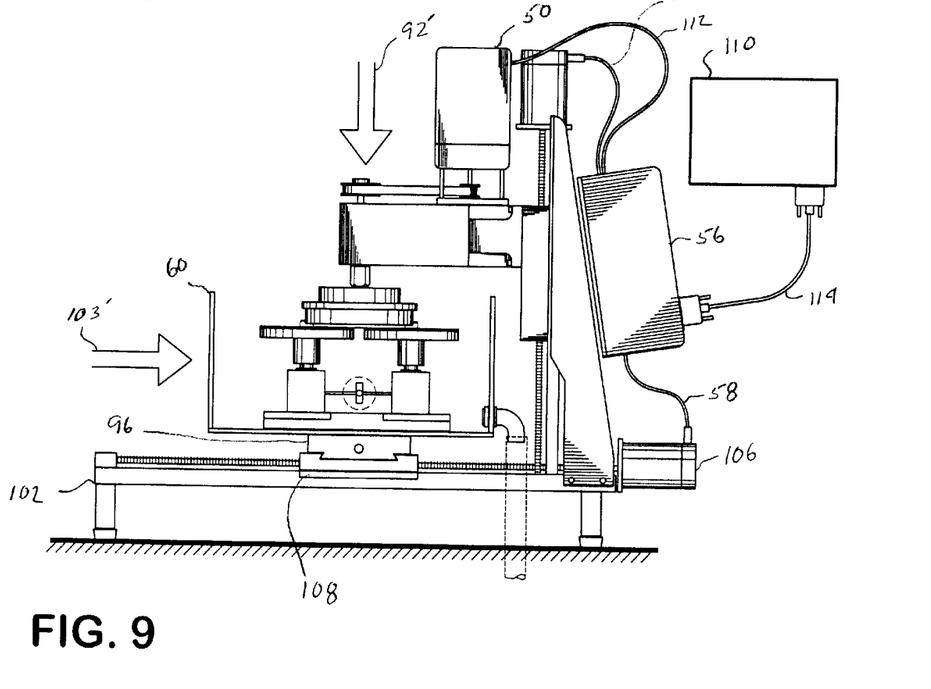
FIG. 9 is a perspective view, partially in section of the automatic disc repair system further illustrating the adjustability of the adjustable base along a third axis and the adjustability of the vertically adjustable assembly along a fourth axis according to a preferred embodiment of the present invention.

FIG. 8 is a perspective view, partially in section, of the automatic disc repair system 20 illustrating the adjustability of the adjustable base 34 outward, as shown, along a third axis 103, which is preferably in the direction of Axis Y (See FIG. 1) and preferably horizontal, and the adjustability of the vertically adjustable assembly 52 upward, as shown, along a fourth axis 92, which is preferably in the direction of Axis Z (See FIG. 1) and preferably in the vertical direction, according to a preferred embodiment of the present invention. FIG. 9 is a perspective view, partially in section, of the automatic disc repair system further illustrating the adjustability of the adjustable base 34 inward, as shown, along a third axis 103', which is preferably in the direction of Axis Y (See FIG. 1) and preferably horizontal, and the adjustability of the vertically adjustable assembly 52 downward, as shown, along a fourth axis 92', which is preferably in the direction of Axis Z (See FIG. 1) and preferably in the vertical direction, according to a preferred embodiment of the present invention.

Preferably, platform 96 is supported by base 102 which is slidably adjustable using a screw 104 and actuator 106 assembly, as shown, to adjust the base 102 along third axis 103 and 103' (Axis Y). Preferably, platform 96 is supported by base 102 using a slidable reverse bevel key-way and groove assembly 108, as shown. Preferably, the actuator 106 is digitally controlled, however, under appropriate circumstances other arrangements may suffice.

Figure 10:
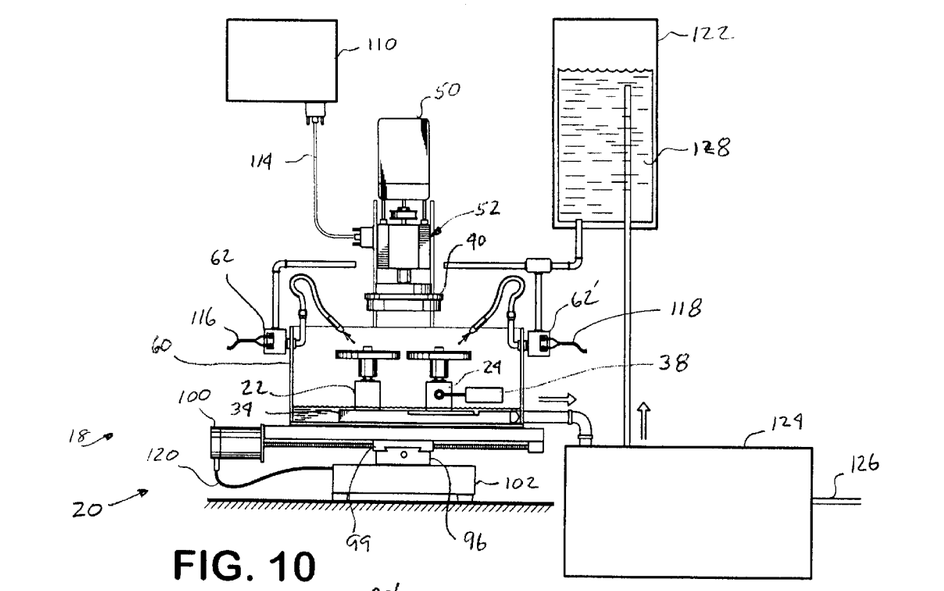
FIG. 10 is a front view of the automatic disc repair system according to a preferred embodiment of the present invention.

Preferably, the digital control comprises a computer 110, however, under appropriate circumstances other arrangements may suffice. Preferably, computer 110 is connected to a control unit 56 which in turn is preferably hard-wire-connected to control the adjustable base 34, sliding mechanism 36 and vertically adjustable assembly 52. In addition, the control unit 56 also preferably controls the actuator 38, power drive motor 50 speed, vertically adjustable assembly 52, on/off power to the motors, solenoid valve 62, actuator 100, actuator 106 assembly and may also be used to control (per the later description herein) the placement or removal of the discs 72 from the respective support surfaces 30a, 30b, 30c, and 30d. FIG. 10 is a front view of the automatic disc repair system 20 according to a preferred embodiment of the present invention. The preferable hard-wiring is further illustrated in FIG. 8, FIG. 9 and FIG. 10 as: cable 112, connecting the control unit 56 to the power drive motor 50; cable 54, connecting the control unit 56 to vertically adjustable assembly 52; cable 58, connecting the control unit 56 to actuator 106 assembly; cable 114, connecting the control unit 56 to computer 110; cable 116, connecting the control unit 56 to solenoid valve 62; cable 118, connecting the control unit 56 to solenoid valve 62'; and cable 120, connecting the control unit 56 to actuator 100.

FIG. 10 illustrates reservoir 122 which preferably holds abrasive 90 material. In the illustrated preferred embodiment, one reservoir 122 is used for each multiple station in an assembly line set-up which will be discussed further below. In another preferred embodiment, multiple reservoirs 122 may be used or a single reservoir divided into compartments, one for each diamond abrasive grit. Under appropriate circumstances, other arrangements may suffice. As discussed previously, the preferred diamond grits are 60 microns, 30 microns, 15 microns and 6 microns. The abrasive 90 is preferably dispersed through the use of solenoid valve 62 which comprises an adjustable spray arm 64 and spray tip 66 and solenoid valve 62', adjustable spray arm 64' and spray tip 66'. Preferably, the solenoid valve 62 is connected to the computer 110 which preferably sends a digital signal to the control unit 56 assisting in controlling abrasive material which is to be sprayed onto the discs 72 on support surfaces 30a, 30b, 30c, and 30d. Preferably, the preferred embodiment utilizes a filter and pump 124 arrangement to recycle the diamond abrasive and filter out the impurities from the abrasive process, thereby allowing re-use of the diamond abrasive. Preferably, the abrasive 90 material is a slurry 128 composed of a mix of diamond abrasive and fluid. Preferably a fluid make-up source 126 is connected to the filter and pump 124 to add additional fluid required to replace that lost through the refurbishing process. The fluid is preferably water.

The operation of the automatic disc repair system 20 will now be further detailed according to a preferred embodiment of the present invention. Preferably, when utilizing a single automatic disc repair system 20, comprising a single station 18, the following sequencing occurs, preferably in an automated fashion (using a computer 110 programmed for sending control information to the control unit 56):

Sequence    Action

A) The power driven rotatable polisher 40 is located in a raised position by raising vertically adjustable assembly 52 along Axis Z, as shown in FIG. 8.

B) Adjustable base 34 is arranged along two axis, Axis X and Axis Y. Preferably adjusting base 34 fully outward along Axis Y and centering base 34 along Axis X, such that Axis Z is centered perpendicular to Axis X, as partially shown in FIG. 8.

C) Rotatable disc supports 22 and 28 are arranged such that all the support surfaces 30a, 30b, 30c, and 30d will be aligned in such a manner that they are adjusted along Axis X', which is preferably parallel to Axis X, such that during operation of the automatic disc repair system 20, the rotatable polisher 40 preferably will contact all four discs 72 simultaneously (referencing FIG. 4 and FIG. 9), which are placed on support surfaces 30a, 30b, 30c, and 30d to polish all the discs 72 up to the stacking ring 76 (shown in FIG. 2). This distance varies depending on whether a CD or DVD disc is being refurbished.

D) Preferably, subsequent to the above described positioning of the automatic disc repair system 20, either by automation or by manual means a disc 72 is placed onto each respective support surfaces 30a, 30b, 30c, and 30d.

E) Adjustable base 34 is arranged along two axis, Axis X and Axis Y. Preferably, base 34 is then adjusted along Axis Y and along Axis X, such that Axis Z is centered perpendicular to Axis X; and the rotatable polisher 40 along Axis Z will contact all four discs 72 simultaneously, when lowered as shown in FIG. 4 onto support surfaces 30a, 30b, 30c, and 30d such that the rotatable polisher 40 will polish all the discs 72 up to the stacking ring 76 simultaneously.

F) Preferably, the power driven rotatable polisher 40 is then located in a lowered position by lowering vertically adjustable assembly 52 along Axis Z, as shown in FIG. 9 such that the rotatable polisher 40 along Axis Z will contact all four discs 72 simultaneously (when lowered as shown in FIG. 4, onto the support surfaces 30a, 30b, 30c, and 30d).

G) Preferably, as the rotatable polisher 40 contacts the four discs 72, the computer preferably sends a digital signal to the control unit 56 preferably starting the power drive motor 50 and setting the speed of the power drive motor 50 such that the spindle will rotate at about 1200 Revolutions per minute (RPM). In the described embodiment, an RPM of about 1200 preferably applied for approximately 1 minute of polishing per respective application of diamond abrasive grit will yield the preferred amount of removal of the plastic layer 82 (such that the plastic layer 82 is refurbished and the scratches removed after complete application of the described series of abrasives 90). Under appropriate circumstances, those knowledgeable in the art may choose to use other appropriate arrangements of revolutions per minute, polishing time, and abrasive that will also suffice.

H) Preferably, as the rotatable polisher 40 contacts the four discs 72, abrasive 90 is applied onto the four discs 72. Preferably, the abrasive 90 is applied using multiple reservoirs 122 or a single reservoir 122 divided into compartments, one for each diamond abrasive grit (Under appropriate circumstances other arrangements may suffice). As discussed previously, the preferred diamond grits are 60 microns, 30 microns, 15 microns and 6 microns. The abrasive 90 is preferably dispersed through the use of solenoid valve 62 which comprises an adjustable spray arm 64 and spray tip 66 and solenoid valve 62', adjustable spray arm 64' and spray tip 66'. Preferably, the solenoid valve 62 is connected to the computer 110 which preferably sends a digital signal to the control unit 56 assisting in controlling abrasive material which is to be sprayed onto the discs 72 on support surfaces 30a, 30b, 30c, and 30d.

I) Preferably, upon completion of the series of abrasive 90 applications and cleanings described above, the power driven rotatable polisher 40 is re-located in a raised position by raising vertically adjustable assembly 52 along Axis Z, as shown in FIG. 8. Adjustable base 34 is arranged along two axis, Axis X and Axis Y. Preferably adjusting base 34 fully outward along Axis Y and centering base 34 along Axis X, such that Axis Z is centered perpendicular to Axis X, as partially shown in FIG. 8. Then, discs 72 are removed from the support surfaces 30a, 30b, 30c, and 30d. Preferably, the discs 72 are checked to verify all scratches have been removed and the disc 72 is ready for playback. Preferably, a laser photo-check device 128 (see FIG. 11) is used to check the disc 72 for proper scratch removal.

Figure 11:
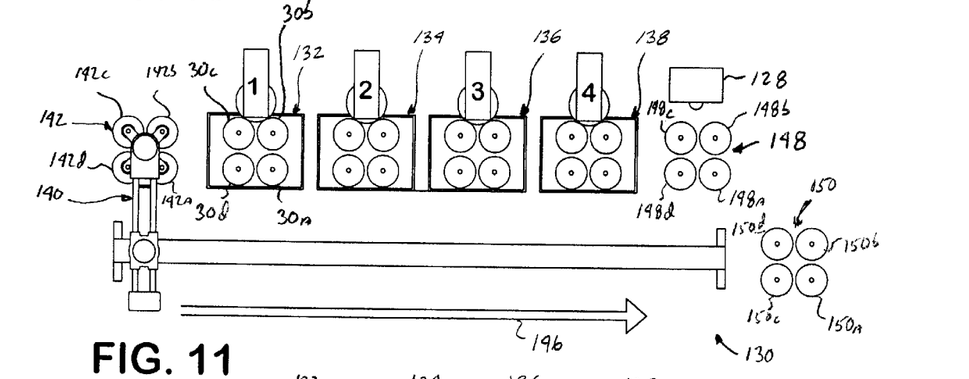
FIG. 11 is a plan view of the automatic disc repair system utilizing multiple stations according to another preferred embodiment of the present invention.
Figure 12:
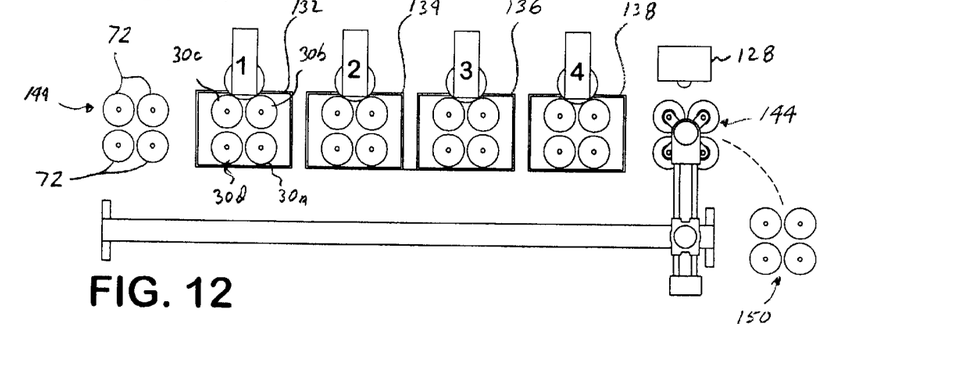
FIG. 12 is a further illustration in plan view of the automatic disc repair system of FIG. 11.

FIG. 11 is a plan view of the automatic disc repair system 130 utilizing multiple stations 132, 134, 136, and 138 according to another preferred embodiment of the present invention. FIG. 12 is a further illustration in plan view of the automatic disc repair system 130 of FIG. 11. In this embodiment, the automatic disc repair system 130 comprises multiple stations 132, 134, 136, and 138, respectively. Preferably each station 132, 134, 136, and 138 comprises a single station 18 as described above with minor modifications to work within a system of four stations. Preferably, the disc repair system 130 is automated. Preferably, a robotic-arm assembly 140 utilizing a vacuum-head assembly 142 is used to remove and replace discs 72 along the four stations 132, 134, 136, and 138, respectively. The general use of such equipment as robotic-arm assembly 140 and vacuum-head assembly 142 is well known by those skilled in such art. Under appropriate circumstances other methods and machinery may be used to accomplish such tasks.

In operation, as illustrated in FIG. 11 and FIG. 12, the robotic-arm assembly 140 preferably picks up four scratched discs 72 from a stack 144 of such discs. Preferably the disc stack 144 is located as shown, such that the robotic-arm assembly can move in a straight line, as shown and illustrated by line 146. Preferably, the robotic-arm assembly 140 comprises a vacuum-head assembly 142 which is able to pick-up a single disc 72 or multiple discs 72. In the illustrated preferred embodiment, the vacuum-head assembly 142 further comprises four pick-up heads 142a, 142b, 142c and 142d enabling the vacuum-head assembly 142 to pick up four discs 72 at a time.

Preferably, the first station 132 operates as described above for single station 18, positioning as described above in sequencing "A" through "C". Preferably, the robotic-arm assembly 140 is positioned, preferably by use of a computer-program-controlled system working in conjunction with the control units 56 of the individual stations. Preferably, the entire operation of the automatic disc repair system 130 is controlled by a single master program. Those knowledgeable in the art are familiar with such control systems and under appropriate circumstances other combinations of control systems may also suffice. Preferably, the robotic-arm assembly 140 moves to a position wherein the four pick-up heads 142a, 142b, 142c and 142d places the discs 72 onto each respective support surfaces 30a, 30b, 30c, and 30d (described above in sequence "D" as being by manual or automatic means). Once the discs 72 are placed onto each respective support surface 30a, 30b, 30c, and 30d, sequencing "E" through "G" preferably takes place. Preferably, during sequence "H", first station 132 utilizes a heavier abrasive 90, preferably 60 micron grit diamond abrasive. Preferably, sequence "I" occurs relocating the polisher 40 in a raised position by raising vertically adjustable assembly 52 along Axis Z, as shown in FIG. 8 and locating adjustable base 34 fully outward along Axis Y and centering base 34 along Axis X, such that Axis Z is centered perpendicular to Axis X, as partially shown in FIG. 8. Preferably, robotic-arm assembly 140 then operates vacuum-head assembly 142 utilizing pick-up heads 142a, 142b, 142c and 142d to remove the discs 72 from each respective support surface 30a, 30b, 30c, and 30d picking up the respective discs 72 from the first station 132 respective support surfaces 30a, 30b, 30c, and 30d and transferring them respectively to second station 134 respective support surfaces 30a, 30b, 30c, and 30d.

Preferably, the sequencing described above for station 132 is repeated in station 134 except that abrasive 90 is preferably reduced to 30 micron grit. Preferably, upon completion of the sequencing at station 134, robotic-arm assembly 140 then operates vacuum-head assembly 142 picking up the discs 72 from the second station 134 support surfaces 30a, 30b, 30c, and 30d and transferring them to third station 136 support surfaces 30a, 30b, 30c, and 30d.

Preferably, the sequencing described above for station 134 is repeated in station 136 except that abrasive 90 is preferably reduced to 15 micron grit. Preferably, upon completion of the sequencing at station 136, robotic-arm assembly 140 then operates vacuum-head assembly 142 picking up the discs 72 from the third station 136 support surfaces 30a, 30b, 30c, and 30d and transferring them to fourth station 138 support surfaces 30a, 30b, 30c, and 30d.

Preferably, the sequencing described above for station 136 is repeated in station 138 except that abrasive 90 is preferably reduced to 6 micron grit. Preferably, upon completion of the sequencing at station 138, robotic-arm assembly 140 then operates vacuum-head assembly 142 picking up the discs 72 from the fourth station 138 support surfaces 30a, 30b, 30c, and 30d and transferring them to a temporary stack 148 which comprises four similar support surfaces 148a, 148b, 148c, and 148d.

Preferably, the discs 72 are then checked for scratches by a laser photo-check device 128 (see FIG. 11). Preferably, rejected discs 72 are placed in a rejected stack 150 comprising similar support surfaces 150a, 150b, 150c, and 150d.

Preferably, after the station "line" is in full operation, the discs 72 have been removed from the fourth station 138 support surfaces 30a, 30b, 30c, and 30d, the robotic-arm assembly 140 may be seen as sequentially operating vacuum-head assembly 142 picking up the discs 72 from a third station 136 and placing them on an empty fourth station 138; then picking up the discs 72 from a second station 134 and placing them on a third station 136; then picking up the discs 72 from a first station 132 and placing them on a second station 134; and finally picking up the discs 72 from the stack 144 and placing them on a first station 132. Under appropriate circumstances, multiple "lines" may be implemented by a single robotic-arm assembly or one or more "lines" may be implemented by a desired number of robotic arm assemblies. It is preferred in the described embodiment to use one robotic arm assembly for each pair of "lines" (see FIG. 13).

Preferably, each station 132, 134, 136, and 138 has a reservoir 122 as shown in FIG. 10 and described above, which preferably holds abrasive 90 material. Preferably, one reservoir 122 is used for each multiple station 132, 134, 136, and 138 in an assembly line set-up and contains a single grit for each station. For example, reservoir 122 at station 132 preferably holds 60 micron grit; reservoir 122 at station 134 preferably holds 30 micron grit; reservoir 122 at station 136 preferably holds 15 micron grit; and reservoir 122 at station 138 preferably holds 6 micron grit. Further, each station 132, 134, 136, and 138 preferably has a filter and pump 124 arrangement to recycle the diamond abrasive and filter out the impurities from the abrasive process, thereby allowing re-use of the diamond abrasive.

Figure 13:
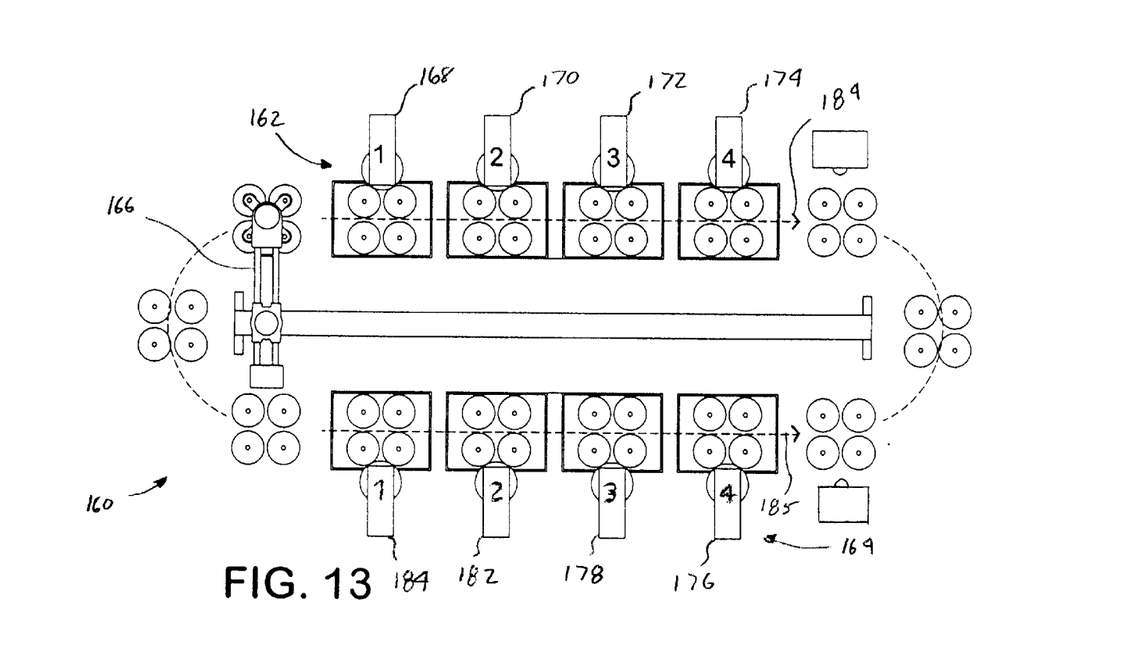
FIG. 13 is a plan view of multiple stations of the automatic disc repair system according to a further preferred embodiment of the present invention.

FIG. 13 is a plan view of multiple stations of the automatic disc repair system 160 according to a further preferred embodiment of the present invention. In this embodiment, two four-station automatic disc repair sub-systems 162 and 164 (or "lines") are working together with a single robotic-arm 166. Under appropriate circumstances multiple robotic arms 166 might also suffice.

Preferably, four-station automatic disc repair sub-system 162 comprises station 168, 170, 172, and 174. Preferably, four-station automatic disc repair sub-system 164 comprises station 176, 178, 180, and 182. Preferably, in the described embodiment, the robotic-arm 166 loads discs 72 onto each respective support surfaces 30a, 30b, 30c, and 30d of each respective station in the direction of Arrow 184 and Arrow 185 (from station 1 through station 4). Under appropriate circumstances, changing the direction of the loading and unloading may be desired.

Preferably, each four-station automatic disc repair sub-system 162 and 164 operates as described above in FIG. 11 and FIG. 12, in describing automatic disc repair system 130. Preferably, automatic disc repair system 160 utilizes a single robotic-arm 166 for both four-station automatic disc repair subsystems 162 and 164. Further, the robotic-arm assembly 140 is positioned and operated, preferably, by use of a computer program controlled system working in conjunction with the control units 56 of the individual stations. Preferably, the entire operation of the automatic disc repair system 160 is controlled by a single master program and computer that coordinates the single robotic-arm 166 and the operation of the individual stations 168, 170, 172, 174, 176, 178, 180, and 182.

Figure 14:
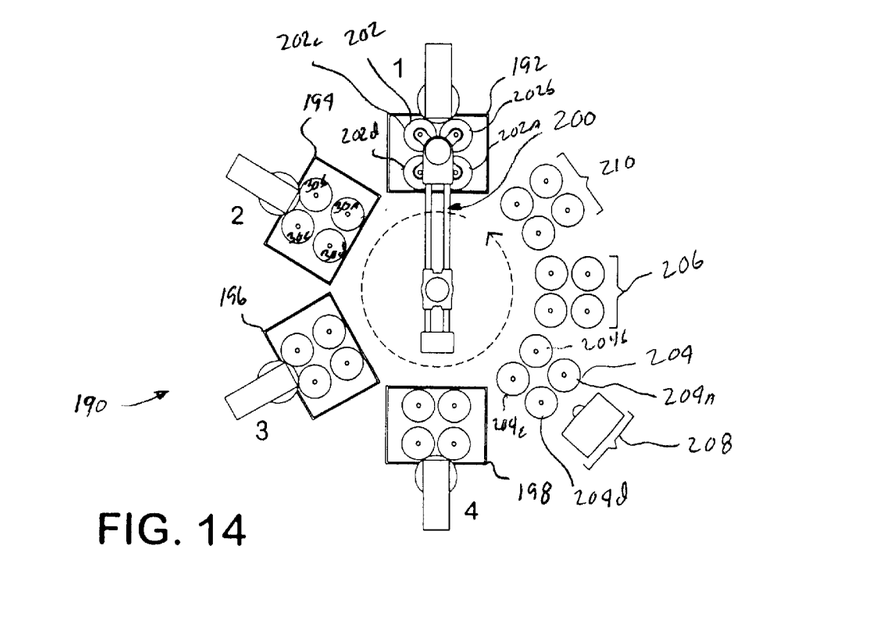
FIG. 14 is a plan view of multiple stations of the automatic disc repair system according to an even further preferred embodiment of the present invention.

FIG. 14 is a plan view of multiple stations of the automatic disc repair system 190 according to an even further preferred embodiment of the present invention. Preferably, in this embodiment, a four-station system comprising stations 192, 194, 196, and 198 is arranged in a circular manner as illustrated. Preferably, a single robotic-arm assembly 200 then operates vacuum-head assembly 202 utilizing pick-up heads 202a, 202b, 202c and 202d to remove the discs 72 from the disc stack 210 and placing the discs 72 onto each respective support surfaces 30a, 30b, 30c, and 30d of the station 192. Preferably, as described above, sequencing "E" through "G" preferably takes place. Preferably, during sequence "H", first station 192 utilizes a heavier abrasive 90, preferably 60 micron grit diamond abrasive. Preferably, the robotic-arm assembly 200 then moves to a position to have vacuum-head assembly 202 utilize pick-up heads 202a, 202b, 202c and 202d to remove the discs 72 from first station 192 support surfaces 30a, 30b, 30c, and 30d and transferring them to second station 194 support surfaces 30a, 30b, 30c, and 30d.

Preferably, the sequencing described above for station 192 is repeated in station 194 except that abrasive 90 is preferably reduced to 30 micron grit. Preferably, upon completion of the sequencing at station 194, robotic-arm assembly 200 then operates vacuum-head assembly 202 picking up the discs 72 from the second station 194 support surfaces 30a, 30b, 30c, and 30d and transferring them to third station 196 support surfaces 30a 30b, 30c, and 30d.

Preferably, the sequencing described above for station 194 is repeated in station 196 except that abrasive 90 is preferably reduced to 15 micron grit. Preferably, upon completion of the sequencing at station 196, robotic-arm assembly 200 then operates vacuum-head assembly 202 picking up the discs 72 from the third station 196 support surfaces 30a, 30b, 30c, and 30d and transferring them to fourth station 198 support surfaces 30a, 30b, 30c, and 30d.

Preferably, the sequencing described above for station 196 is repeated in station 198 except that abrasive 90 is preferably reduced to 6 micron grit. Preferably, upon completion of the sequencing at station 198, robotic-arm assembly 200 then operates vacuum-head assembly 202 picking up the discs 72 from the fourth station 198 support surfaces 30*a*, 30*b*, 30*c*, and 30*d* and transferring them to a temporary stack 204 which comprises four similar support surfaces 204*a*, 204*b*, 204*c*, and 204*d*. Preferably, the discs 72 are checked for scratches by a laser photo-check device 208 (see FIG. 11). Preferably, rejected discs 72 are placed in a rejected stack 206.

Preferably, after the discs 72 have been removed from the fourth station 198 support surfaces 30*a*, 30*b*, 30*c*, and 30*d*, and the "line" is operating, the robotic-arm assembly 200 then generally preferably operates vacuum-head assembly 202 picking up the discs 72 from the third station 196 and placing them on the fourth station 198; then picking up the discs 72 from the second station 194 and placing them on the third station 196; then picking up the discs 72 from the first station 192 and placing them on the second station 194; and finally picking up the discs 72 from the stack 210 and placing them on the first station 192. This sequencing of operation may be preferably altered depending on how long an operation at each station takes, how many arms are used, etc.

Preferably, the entire operation of the automatic disc repair system 190 is controlled by a single master program. Those knowledgeable in the art are familiar with such control systems and under appropriate circumstances other combinations of control systems may also suffice.

Although applicant has described applicant's preferred embodiments of this invention, it will be understood that the broadest scope of this invention includes such modifications as diverse shapes and sizes and materials. Such scope is limited only by the below claims as read in connection with the above specification. Further, many other advantages of applicant's invention will be apparent to those skilled in the art from the above descriptions and the below claims.

What is claimed is:

1. A system, for reconditioning at least one scratched operating surface of at least one optically-read disc, comprising, in combination:
    a) at least one rotatable supporter, comprising a support surface positioned in substantially a first plane, to support the at least one optically-read disc;
    b) at least one powered rotater to rotate said at least one rotatable supporter; and
    c) at least one abrader, rotatably powered by said at least one powered rotater, structured and arranged to repair the operating surface of at least one optically-read disc by abrading the scratched operating surface by rotation in a second plane substantially parallel to said first plane.

2. The system according to claim 1,
    b) wherein said at least on abrader further comprises a series of diamond grit abrasives ranging from a larger diamond grit to a smaller diamond grit.

3. The system according to claim 1 wherein said at least one abrader is structured and arranged to only abrade the data storage band portion of the at least one optically-read disc.

4. The system according to claim 1 wherein said at least one rotatable supporter comprises at least one spindle adapted to fit a central aperture of the at least one optically-read disc.

5. The system according to claim 1 wherein said at least one abrader is adapted to abrade the protective layer of the at least one optically-read disc.

6. The system according to claim 1 wherein said at least one abrader is adapted to abrade the plastic layer of the at least one optically-read disc.

7. A system, for reconditioning at least one scratched operating surface, of each of a plurality of optically-read discs comprising central apertures, comprising, in combination:
    a) a plurality of rotatable supporting means, comprising a plurality of support surfaces, each respective said support surface being positioned in substantially a first plane, for supporting each respective optically-read discs;
    b) power means for powered rotation about a first axis;
    c) abrader means, rotatably powered by said power means, for abrading each respective scratched operating surface of each respective optically-read disc by rotation in a second plane substantially parallel to said first plane;
    d) wherein each respective said support surface comprises at least one spindle adapted to fit the central aperture of each respective optically-read disc.

8. The system according to claim 7 further comprising disc transport means for placing a plurality of respective optically-read discs on respective said support surfaces.

9. The system according to claim 8, further comprising:
    a) abrasive means for abrading at least one scratched operating surface of at least one optically-read disc; and
    b) wherein said abrasive means comprises a series of diamond grit abrasives ranging from a larger diamond grit to a smaller diamond grit.

10. The system according to claim 7 further comprising disc transport means for removing a plurality of respective optically-read discs from respective said support surfaces.

11. The system according to claim 10, further comprising:
    a) abrasive means for abrading at least one scratched operating surface of at least one optically-read disc; and
    b) wherein said abrasive means comprises a series of diamond grit abrasives ranging from a larger diamond grit to a smaller diamond grit.

12. The system according to claim 7, further comprising:
    a) abrasive means for abrading at least one scratched operating surface of at least one optically-read disc; and
    b) wherein said abrasive means comprises a series of diamond grit abrasives ranging from a larger diamond grit to a smaller diamond grit.

13. A system, for reconditioning at least one scratched operating surface of each of a plurality of optically-read discs comprising central apertures, comprising, in combination:
    a) a plurality of system stations, each said system station comprising;
        i) a plurality of rotatable supporting moans, comprising a plurality of support surfaces, each respective said support surface being positioned in substantially a first plane, for supporting each respective optically-read discs;
        ii) power means for powered rotation about a first axis;
        iii) abrader means, rotatably powered by said power means, for abrading each respective scratched operating surface of each respective optically-read disc by rotation in a second plane substantially parallel to said first plane
        iv) wherein each respective said support surface comprises at least one spindle adapted to fit the central aperture of each respective optically-read disc; and
    b) disc transport means for moving each respective optically-read disc from a first said system station to a second said system station.

14. The system according to claim 13 further comprising;
a) abrasive means for abrading at least one scratched operating surface of at least one optically-read disc;
b) wherein said abrasive means comprises a plurality of abrasive compounds, each said abrasive compounds comprising a different range of grit sizes; and
c) wherein each said system station is structured and arranged to utilize at least one said range of grit sizes of said abrasive compounds.

15. The system according to claim 14 wherein a first said system station utilizes a larger said range of grit sizes of said abrasive compounds than an adjoining second said system station.

16. The system according to claim 15 wherein said disc transport means is structured and arranged to transport said at least one disc from said first station to said second station.

17. The system according to claim 16, further comprising:
a) abrasive means for abrading at least one scratched operating surface of at least one optically-read disc; and
b) wherein said abrasive means comprises a series of diamond grit abrasives ranging from a larger diamond grit to a smaller diamond grit.

18. The system according to claim 15, further comprising:
a) abrasive means for abrading at least one scratched operating surface of at least one optically-read disc; and
b) wherein said abrasive means comprises a series of diamond grit abrasives ranging from a larger diamond grit to a smaller diamond grit.

19. The system according to claim 14, further comprising:
a) abrasive means for abrading at least one scratched operating surface of at Least one optically-read disc; and
b) wherein said abrasive means comprises a series of diamond grit abrasives ranging from a larger diamond grit to a smaller diamond grit.

20. The system according to claim 13, further comprising:
a) abrasive means for abrading at least one scratched operating surface of at least one optically-read disc; and
b) wherein said abrasive means comprises a series of diamond grit abrasives ranging from a larger diamond grit to a smaller diamond grit.

\* \* \* \* \*

UNITED STATES PATENT AND TRADEMARK OFFICE
CERTIFICATE OF CORRECTION

PATENT NO. : 6,726,527 B2
DATED : April 27, 2004
INVENTOR(S) : Lalli et al.

It is certified that error appears in the above-identified patent and that said Letters Patent is hereby corrected as shown below:

Column 13,
Line 51, "on" should read -- one --

Column 14,
Line 2, "surface, of" should read -- surface of --
Line 51, "moans" should read -- means --

Column 16,
Line 10, "Least" should read -- least --

Signed and Sealed this

Twenty-fourth Day of August, 2004

JON W. DUDAS
*Director of the United States Patent and Trademark Office*